(12) United States Patent
Hatalkar et al.

(10) Patent No.: US 8,453,179 B2
(45) Date of Patent: May 28, 2013

(54) LINKING REAL TIME MEDIA CONTEXT TO RELATED APPLICATIONS AND SERVICES

(75) Inventors: Atul N. Hatalkar, Chandler, AZ (US); Sharad K. Garg, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 373 days.

(21) Appl. No.: 12/703,990

(22) Filed: Feb. 11, 2010

(65) Prior Publication Data

US 2011/0197226 A1    Aug. 11, 2011

(51) Int. Cl.
*G06F 3/00* (2006.01)
*H04H 9/00* (2006.01)
*H04N 7/10* (2006.01)
*H04N 5/445* (2011.01)
*H04N 11/00* (2006.01)
*G06F 13/00* (2006.01)
*G06Q 30/00* (2006.01)

(52) U.S. Cl.
USPC .......... 725/51; 725/20; 725/34; 725/39; 725/53; 348/465; 705/14.67; 715/708; 707/708

(58) Field of Classification Search
USPC .......... 725/38, 20, 34, 39, 51, 53; 348/465; 705/14.67; 715/708; 707/708
See application file for complete search history.

(56) References Cited

U.S. PATENT DOCUMENTS

| 7,793,326 | B2 * | 9/2010 | McCoskey et al. | 725/91 |
| 7,979,880 | B2 * | 7/2011 | Hosea et al. | 725/46 |
| 8,000,500 | B2 * | 8/2011 | Park et al. | 382/107 |
| 2010/0313215 | A1 * | 12/2010 | McCoskey et al. | 725/31 |
| 2011/0154399 | A1 * | 6/2011 | Jin et al. | 725/46 |

OTHER PUBLICATIONS

Johnson, Brian D., et al., "Linking Disparate Content Sources," International # PCT/US2009/058877, Filed on Sep. 29, 2009 (23 pages).
Johnson, Brian D., et al., "Searching and Extracting Digital Images From Digital Video Files," U.S. Appl. No. 12/623,969, filed Nov. 23, 2009, (18 pages).

* cited by examiner

*Primary Examiner* — Hoang-Vu A Nguyen-Ba
(74) *Attorney, Agent, or Firm* — Trop, Pruner & Hu, P.C.

(57) ABSTRACT

Information about the context of electronic media may be extracted automatically. The extracted information may then be used to select ancillary services or applications that may be of interest to the user. The context information may be developed from ancillary information associated with the media, such as metadata or electronic programming guides. It may also be extracted from the media itself, including identification of image elements, audio elements, or other depicted features within the media in order to obtain information about what is being displayed.

20 Claims, 2 Drawing Sheets

LINKING REAL TIME MEDIA CONTEXT TO RELATED APPLICATIONS AND SERVICES

BACKGROUND

This relates generally to apparatus with processor-based devices.

Television may be provided over the Internet or from a broadcast source. Generally, the television program amounts to a digital video stream. The stream may be made up of a series of video frames.

Conventionally, the video stream is received by a receiving device which then processes the video for display. This video processing may include decompression and decoding. It may also include decryption of encrypted video.

In many cases, the television receiver includes computing capabilities. For example, a processor-based television receiver may include a set top box or other consumer electronic device with processing power. Thus, the same video receiver may be responsible for providing other services to the user.

DETAILED DESCRIPTION

Figure 1:
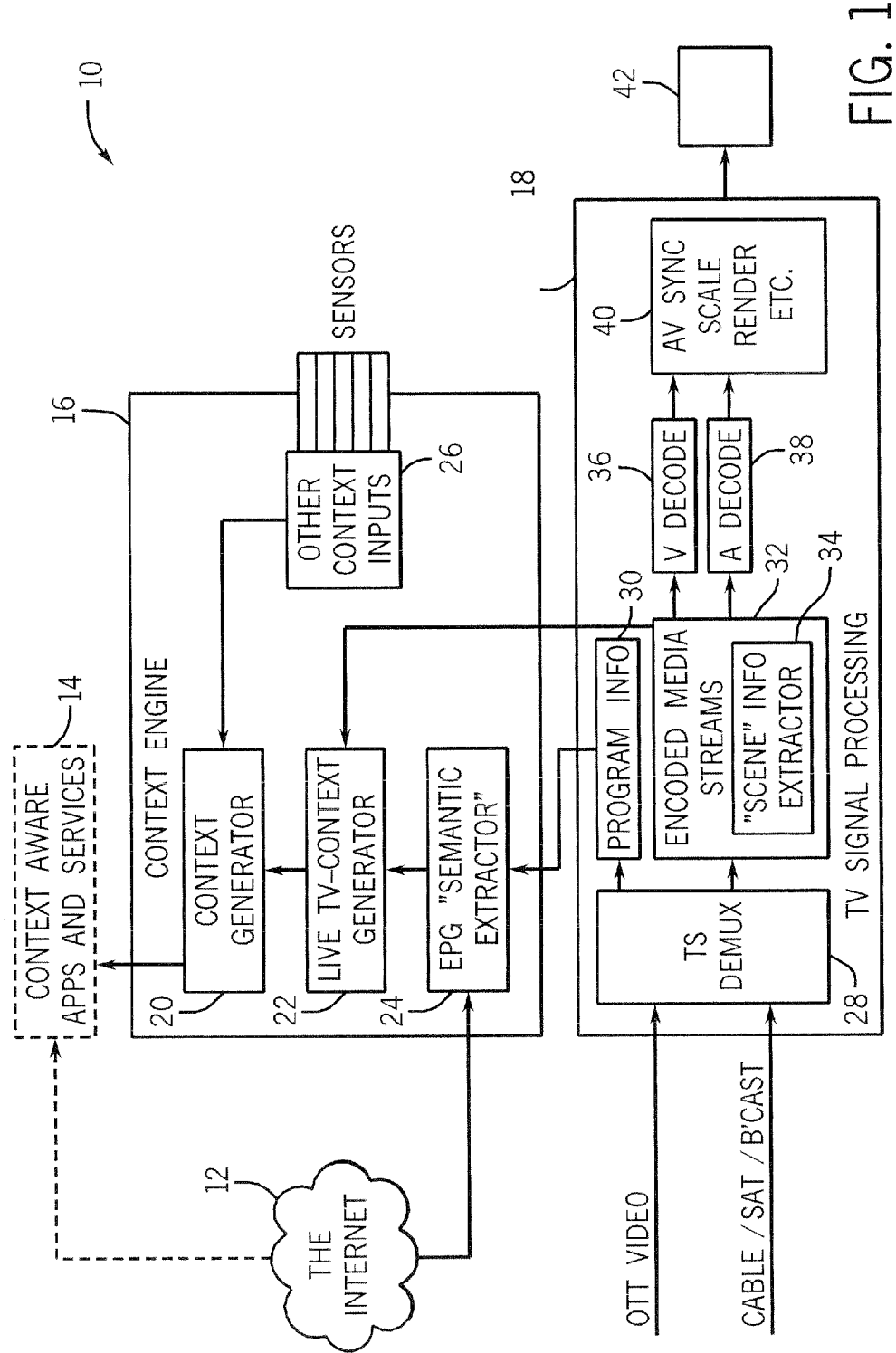
FIG. 1 is a schematic depiction of one embodiment of the present invention.

Referring to FIG. 1, a processor-based device 10 may send and/or receive media. The media may be video, audio, a file or text, such as a document or email, in electronic form, including, for example, television from the Internet or from a broadcast source. The broadcast source may be a television broadcast, a cable transmission, or a satellite broadcast, to mention a few common examples. The processor-based device 10 may be any consumer electronic device, including a dedicated television receiver that is part of a television, a computer, a set top box, a mobile Internet device, or a cellular telephone.

In some embodiments, the device 10 may be coupled to the Internet 12. The device 10 may include context aware applications and services 14. The applications and services 14 may be any applications or services that use the context of media being received or sent. As used herein, "context" includes any information about media sent or received by a processor-based device.

The following discussion relates to an embodiment where the media is television. However, the present invention is not limited to a particular type of media.

The consumer electronic context engine 16 may include a context generator 20, coupled to a live television context generator 22 and an electronic programming guide semantic extractor 24. The semantic extractor may include a natural language translator and interpreter to convert the guide information to a format usable by a processor-based system. Other context inputs may be received at 26 from various sensors. The context engine 16 may include a processor or controller capable of performing general computing tasks and executing the other applications and services 14.

The context engine 16 may be coupled to a television signal processing device 18. The device 18 may include a demultiplexer 28 to receive various forms of television signals, including streaming or over the top (OTT) video, cable, satellite and broadcast video. The demultiplexed video is then provided to a program information source 30.

The program information source may extract information (that is, "context") about the media from any media. For example, it may extract information from an electronic programming guide accompanying the video stream, about the actors, genre, title, program description, channel, time, or rating, as examples.

In addition, the demultiplexed video is provided to an encoded media stream 32. The stream 32 includes a scene information extractor 34. The extractor 34 may identify image, audio or textual elements within the media stream. It may do this by decoding metadata or ancillary data associated with the media stream and particular frames in the stream. It may also do so by recognizing image, audio or text elements within the stream and, in particular, video frames.

For example, image recognition software may be utilized to identify particular persons or objects within frames making up the media stream. Image recognition software may be used in combination with key word searches of available video files on the device 10 or of information available over the Internet. For example, an image may be searched to find like images with identifying textual information associated with those like images in order to identify a particular image feature within a frame of a media stream.

The information from the streams 32 is then provided to a video decoder 36 and an audio decoder 38. An audio/visual synchronizer 40 is coupled to the decoders 36 and 38. The synchronizer 40 may be responsible for scaling and rendering the video and performing other conventional video processing tasks. The processed video is then provided to a video display 42 which, in one embodiment, may be a conventional television display.

Thus, the device 10 may extract two types of contextual information in some embodiments. It may extract media level information, such as the name of a television channel, the program name, the duration, and the theme in the case of television embodiment. This information may be obtained from the Internet and may also be obtained from electronic programming guides provided as part of the media stream. In addition, the scene information extractor may extract a more detailed set of media context information. For example, the extractor 34 may provide real time, dynamic information which may describe the current scene, the current talker, who is visible, the current mood, and so forth in a video example.

The context generator 20 may combine the media context with other situational information sensed by the device 10 to form an overall delivery context. The delivery context may then be made available to a higher level application as a platform service. The higher level application can use the context to deliver personalized and situation appropriate experiences to the user.

For example, without limitation, the device 10 may determine that there is a commercial currently being displayed as part of the television program. In this example, the context is that a commercial is being played as part of the program. In response to this context determination, the device 10 may offer the user an additional application or service 14, such as a game to play during the commercial. While the game is being played by the user, the device 10 may monitor the program to determine when the commercial is over, and may return the user to the ongoing program after the commercial. If the user prefers to continue playing the game, the device 10 may automatically record the ongoing television program, via an application or service 14, such as using a video recorder, for later playback when the user finishes playing the game. The game may be selected automatically by the device 10, in some embodiments, based on the time of day and who is currently watching the program on that device.

By identifying the context information related to who is currently watching the program at the device 10, for example, using sensors, the device 10 may be able to select a game most appropriate for those users. The game may be selected based on characteristics of the users or user submitted preferences, as two examples. The identification of the users may be implemented by conducting a user sign-in or by sensors that sense fingerprints, identify voices, identify images, or use other information suitable to identify the current viewers. The time of day may be additional context information collected from a clock associated with the device 10.

As still another example, the device 10 may determine context in the form of the nature of content that is currently being watched and then may access a related website. For example, if a volleyball game is being watched, a website that provides statistics about the ongoing volleyball game in real time may be accessed so that the user may selectively view the website in conjunction with the television program. Many other examples will occur to those skilled in the art.

As still another example, the context of a television show may be extracted. Then a side bar may be displayed, overlying the television, associated with objects depicted frame of the television program. In one embodiment the side bar may be a user selected icon near a depicted object. When the icon is user selected, the user may be offered an opportunity to get more information or even to buy the object identified within the television program.

Object identification may be performed by the scene information extractor 24, which may continually attempt to identify objects within the media stream. It may use, for example, metadata or ancillary data associated with the media stream to identify an object, image recognition software, Internet searches, monitoring of associated audio, or any other technique.

Thus, the scene information extractor 34 may provide information about objects identified within each scene to the live TV-context generator 22. The live-TV context generator 22 may then attempt to combine information about the information extracted from the scenes by the extractor 34 and the programming guide information collected by extractor 24 and provide that combined information to the context generator 20. The context generator 20 may also collect sensor inputs 26. The context generator 20 may be adapted to feed information about objects identified within the media stream to interested applications and services 14 that may have registered with the generator 20. In some cases, the generator 20 may simply stream information about depicted objects that are the subject of media currently being received or transmitted. In other cases, the generator 20 may only provide that information that was specifically requested by the applications and services.

Thus, for example, in connection with an embodiment in which the user is asked if the user wants to buy depicted objects, a service 14 may only be interested in knowing when an automobile, for example, is being displayed in the media and then it may only want to know about those automobiles that are currently being sold by that service 14.

In some cases, information that is extracted by the scene information extractor 34 may be culled by the context generator 20 based on various criteria. For example, only information that may be of interest to the current user of the device 10 may be extracted. The user who is currently using the device 10 may be identified using the sensors coupled to the context inputs 26. Information may be identified as being relevant to that user, for example, based on that user's historical selections and asserted preferences.

It should be noted that the sensors coupled to the inputs 26 may be hardware or software sensors. By a software sensor, it is intended to refer to software that may mine information from available sources. For example, a software sensor may determine information about the user based on the user's activity on the device 10. For example, the programs the user watches, the Internet sites the user visits, and the information that the user receives and generates may all be mined to find out information about what are the user's interests.

Other sensors may be hardware sensors, such as cameras, microphones, and input/output devices. In addition, a detector may detect what wireless devices are in the vicinity in order to obtain more information about the user. For example, if the user is using a wireless device, such as a personal digital assistant or cellular telephone, information being conveyed to or from such a wireless may also be used, as well as its mere presence in the vicinity of the device 10.

Figure 2:
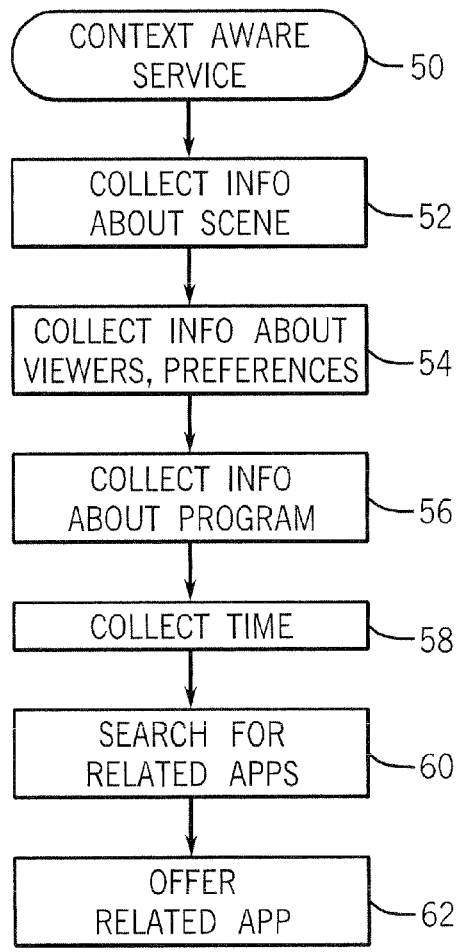
FIG. 2 is a flow chart for one embodiment.

Thus, referring to FIG. 2, the content aware service 50 may be implemented as hardware, software, or firmware. In software embodiments, it may be executed by the context engine 16 in one embodiment. In such a software embodiment, a sequence of instructions may be executed by a processor-based device. The instructions may be stored in a suitable computer readable medium such as a magnetic, semiconductor, or optical memory, for example, which memory may be part of the context engine 16 in one embodiment.

Initially, the service 50 collects context information about the particular scene currently being viewed, as indicated in block 52. This may include identifying particular image elements within the scene, extracting metadata describing information about the scene from the video stream, or accessing associated websites to identify information about the media stream. The collection of context information may also include image recognition software and search services to identify particular objects.

In addition, the information may be collected about the viewers and their preferences, as indicated in block 54. Again, pre-stored information entered by the users about their preferences and their characteristics may be used in one embodiment. The user preferences may also be developed or learned by the device 10 based on the user's selections of television programs and other services.

Next, information may be collected about the particular television program, as indicated in block 56. This may include accessing electronic program guide information and other information available on the Internet about the program, including dedicated websites for the program, a Television Guide website, or other websites.

Next, time information may be collected, as indicated in block 58. The current time may be extracted from a clock associated with the context engine 16, in one embodiment.

Then, a search for related applications may be implemented in block 60. The related applications may be part of the context aware applications and services 14 in one embodiment. The identification of related applications may be based on key words. For example, words or titles may be collected in blocks 52-56. Then these same key words may constitute metadata in context aware applications and services. By matching the key words identified in blocks 52-56 with metadata or key words associated with the applications and services 14, a match can be identified in some embodiments.

Finally, at block 62, the related applications may be offered to the user in real time. This may be done by providing a screen overlay, as one example. The overlay may indicate the availability of related services and applications. Those services may be provided in an overlay in combination with the existing display or, in another embodiment, the existing display may be paused, the services may be provided, and then the display automatically continued thereafter. For example, a video recording feature may be automatically implemented to record the ongoing video display for later presentation after the provision of the alternative services.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    automatically electronically extracting scene information, in real time, from within a electronic media during playback of the electronic media;
    analyzing said scene information to obtain information about what is being depicted in the current scene being played back; and
    using said current scene information to identify a time to offer an additional service during play of the electronic media.

2. The method of claim 1 including automatically extracting context information from television.

3. The method of claim 2 including extracting context information automatically from an electronic programming guide.

4. The method of claim 1 including automatically extracting context information from video media.

5. The method of claim 1 including automatically extracting context information from ancillary information accompanying the electronic media.

6. The method of claim 1 including combining information about a user of an electronic device and context information related to the electronic media on said electronic device.

7. The method of claim 6 including using said combined information to provide said additional service.

8. The method of claim 1, wherein the scene information comprises image, audio, or text elements within the electronic media.

9. The method of claim 1 including identifying when a commercial is playing and, in response to said identifying when a commercial is playing, offering an additional service during play of said commercial.

10. A computer readable medium storing instructions executed by a computer to:
    extract context information from electronic media;
    extract scene information, in real time, from within the electronic media during playback of the electronic media:
    analyze said scene information to obtain information about what is being depicted in the current scene being played back; and
    use said current content information to identify a time to offer an additional service during play of the electronic media.

11. The computer readable medium of claim 10 further storing instructions to extract context information from a television signal.

12. The computer readable medium of claim 11 further storing instructions to extract context information from an electronic programming guide.

13. The computer readable medium of claim 11 further storing instructions to combine information about a user and context information related to said electronic media and to use said combined information to provide said additional service.

14. The computer readable medium of claim 10 further storing instructions to extract context information from video.

15. The computer readable medium of claim 14 further storing instructions to identify an object depicted in a frame of video.

16. An apparatus comprising:
    a media interface; and
    a device to:
        analyze media from said media interface;
        extract context information from said media;
        extract scene information, in real time, from within the media during playback of the media;
        analyze said scene information to obtain information about what is being depicted in the current scene being played back; and
        use said context information to identify a time to offer an additional service during play of the electronic media.

17. The apparatus of claim 16 wherein said apparatus is a consumer electronic device.

18. The apparatus of claim 16 wherein said apparatus is a television receiver.

19. The apparatus of claim 16 wherein said device to extract context from an electronic programming guide.

20. The apparatus of claim 16, said device to combine information about a user of said apparatus with said context information and to use said combined information to provide said service.

* * * * *